July 26, 1960    J. E. McCANSE ET AL    2,946,373
BI-POSITIONABLE SEAT

Filed Aug. 26, 1958    3 Sheets-Sheet 1

INVENTORS
J. E. McCANSE
A. J. VAN AUWELAER

July 26, 1960 J. E. McCANSE ET AL 2,946,373
BI-POSITIONABLE SEAT
Filed Aug. 26, 1958 3 Sheets-Sheet 2
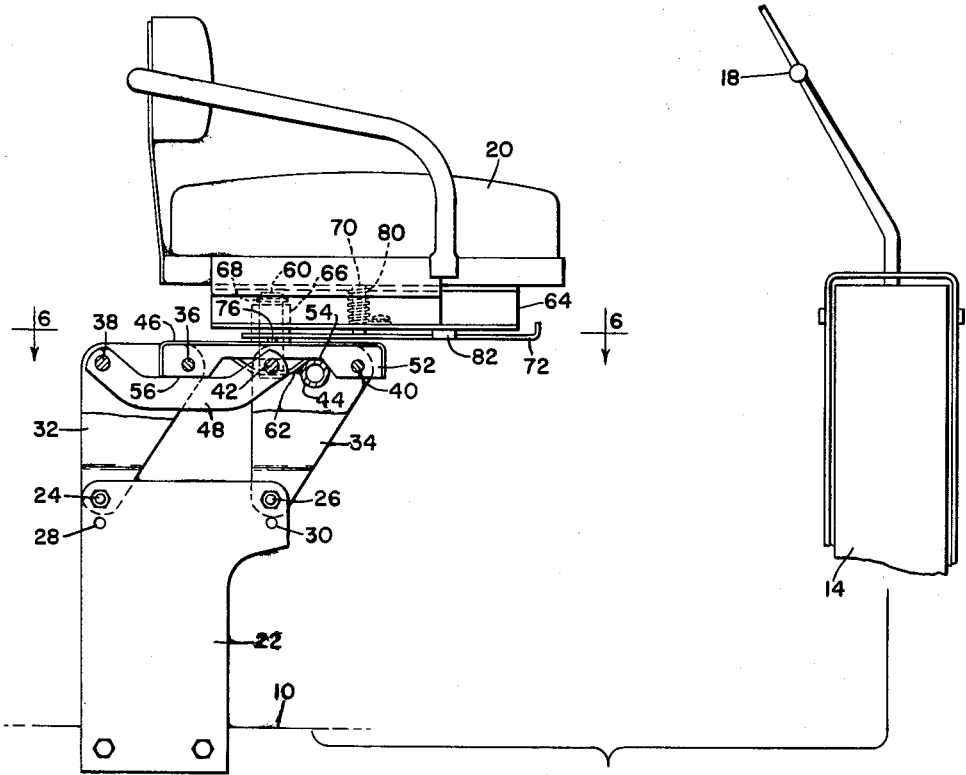
FIG. 3
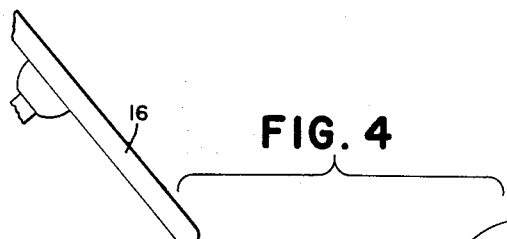
FIG. 4
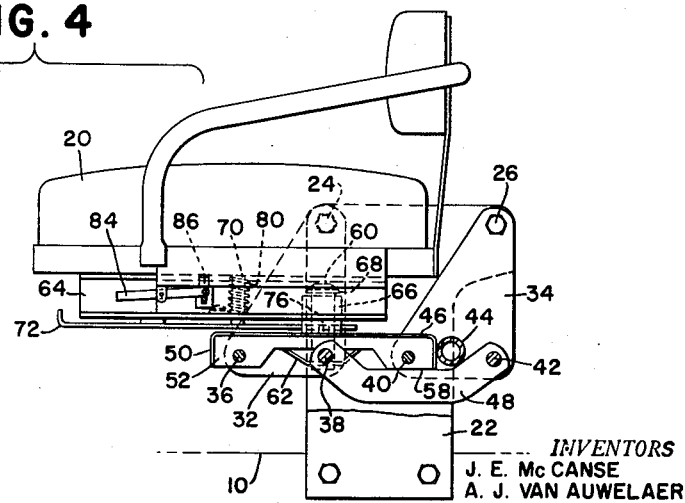
INVENTORS
J. E. McCANSE
A. J. VAN AUWELAER July 26, 1960　　　J. E. McCANSE ET AL　　　2,946,373
BI-POSITIONABLE SEAT
Filed Aug. 26, 1958　　　　　　　　　　　3 Sheets-Sheet 3
FIG. 5
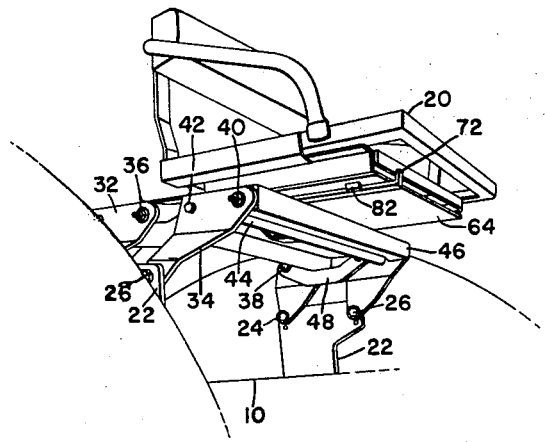
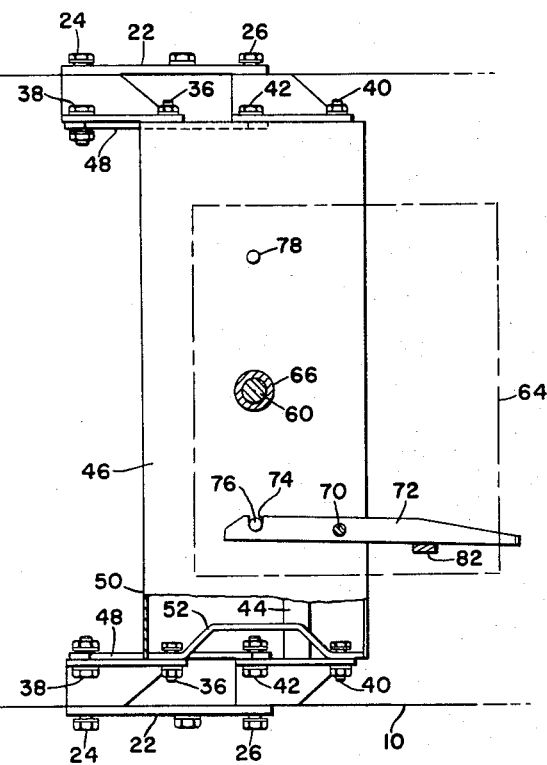
FIG. 6
*INVENTORS*
J. E. McCANSE
A. J. VAN AUWELAER United States Patent Office 2,946,373
Patented July 26, 1960

2,946,373

BI-POSITIONABLE SEAT

James E. McCanse, Moline, and Albert J. Van Auwelaer, East Moline, Ill., assignors to Deere & Company, Moline, Ill., a corporation of Delaware Filed Aug. 26, 1958, Ser. No. 757,403

4 Claims. (Cl. 155—80)

This invention relates to a seat and more particularly to a bi-positionable seat for vehicles whereby to afford the operator a choice of two positions, depending upon which controls he is operating.

The invention finds particular utility in a vehicle-mounted earth-working machine, such as a tractor-mounted back hoe, wherein it is desirable to use the same seat for driving the tractor and also for operating the rear-mounted back hoe. In a typical construction, the normal position of the seat will be relatively low and facing forward, whereby the operator may drive the tractor for transport and maneuvering. Since the back hoe is mounted at the rear of the tractor, it is desirable that the operator be positioned in a rearwardly-facing position, and normally, in addition, the back hoe controls are at a higher level. Therefore, it is in the interests of convenience to arrange the seat so that in its rearwardly facing position it is at a level higher than in its forwardly facing position. The invention also contemplates a reversal of the locations noted. Hence, the expressions "front," "rear," etc., are representative only.

The invention features a novel and simplified linkage arrangement for mounting the seat for movement between the two positions indicated. A further feature is a linkage arrangement which keeps the seat level at all times and prevents cocking and cramping of the linkage. Other advantages and features of the invention reside in stop means for limiting movement of the seat between the two positions; means pivotally mounting the seat on the linkage for swiveling between forwardly facing and rearwardly facing positions; means for releasably locking the seat in either position; and such other features and advantages as will appear from the following detailed description of a preferred embodiment of the invention, taken in conjunction with the accompanying drawings, the several figures of which will be described immediately below.

Fig. 3 is an enlarged fragmentary view, with portions broken away and with parts shown in section, of the seat position illustrated in Fig. 2.

Fig. 4 is a similar view based on the illustration in Fig 1.

Fig. 5 is a perspective of the seat in its relatively high rear position, the view being drawn to a scale intermediate that of Figs. 2 and 3.

Fig. 6 is a section substantially on the line 6—6 of Fig. 3, with portions of the seat shown schematically.

The vehicle background chosen for illustrative purposes is, of course, merely representative of many areas in which the invention finds utility. Therefore, the disclosure is intended to be representative and not limiting.

Figure 1:
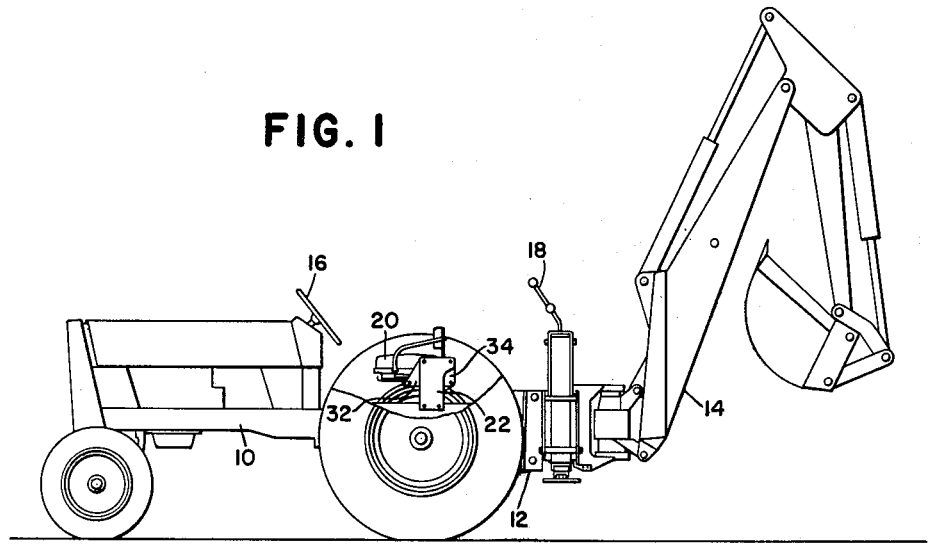
Fig. 1 is a side elevation, on a reduced scale, of a tractor-mounted back hoe illustrating the seat in its relatively low forward position for operation of the tractor.
Figure 2:
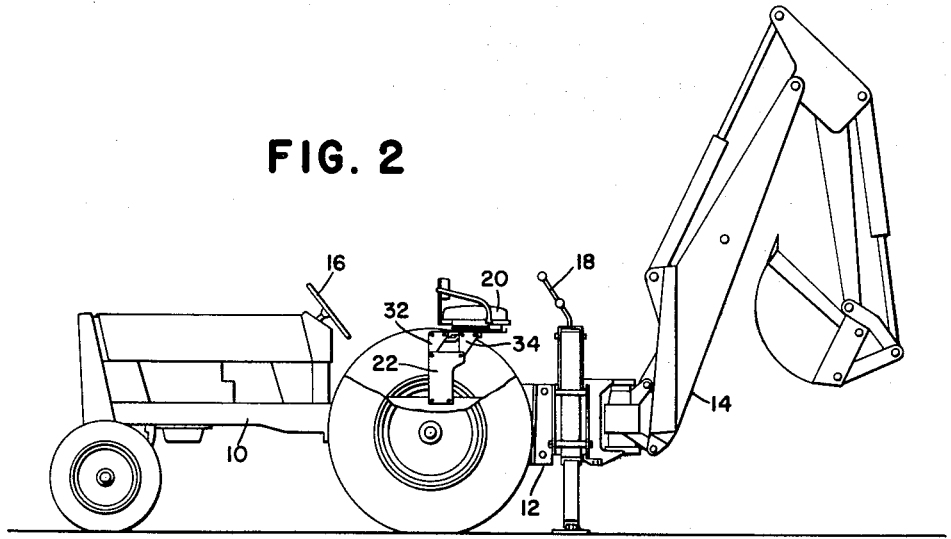
Fig. 2 is a similar view but illustrating the seat in its relatively high rear position for operating the back hoe controls.

The equipment illustrated in Figs. 1 and 2 comprises a typical industrial tractor 10 having a rear supporting portion 12 on which an earth-working implement, such as a back hoe 14, is mounted. The tractor is equipped with conventional controls, representative of which is the steering wheel shown at 16. The back hoe has conventional controls such as represented at 18. The rear portion of the tractor carries a seat 20 which, as will be seen, is intermediate the steering wheel 16 and the back hoe controls 18. According to the invention, the seat is bi-positionable, being mounted on the tractor for movement between the forwardly facing relatively low position of Fig. 1 and the rearwardly facing relatively high position of Fig. 2.

The tractor is equipped with rigid supports 22, preferably in the form of laterally spaced apart fore-and-aft support plates, each of which is provided at its upper end with front and rear fulcra 24 and 26 respectively. Such expressions as "front," "rear" etc., are used on the basis of the particular illustration forming the background for the disclosure for the invention and therefore are words of convenience rather than limitation, since it will be obvious that the directional characteristics could be other than as stated.

In addition to the fulcrum points 24 and 26, the plates 22 may be apertured as at 28 and 30 to provide for vertical variation in the fulcrum points. The two front fulcra at 24 respectively carry a pair of levers 32 having fulcrumed ends mounted on the fulcra, and the rear fulcra 26 carry similar parallel levers 34 similarly mounted. Each front lever 32 has a terminal end provided with a transverse pivot 36 and an intermediate transverse pivot 38 and, as between the two levers 32, the pivots 36 are transversely aligned and those at 38 are transversely aligned, the two levers 32 operating as one. A similar arrangement is provided as respects the rear levers 34, these levers having terminal ends provided with transversely aligned pivots 40 and transversely aligned intermediate pivots 42. The rear levers 34 are rigidly cross connected by a transverse cross bar 44. The levers 32 and 34 are of triangular shape and therefore partake of the nature of bell cranks; although they obviously could be formed as L-shaped members or otherwise.

The levers are interconnected by fore-and-aft parallel link means here comprising a first or upper link structure 46 and a second or lower link arrangement 48. The upper link is mounted at opposite ends on the levers 32 and 34 via the pivots 36 and 40, respectively, and the lower link is connected to the levers at opposite ends via the intermediate pivots 38 and 42, respectively.

The first or upper link structure is preferably in the form of a transverse plate 50 having at its opposite ends fore-and-aft members 52 (Fig. 6) which constitute the upper link structure.

When the seat is in its relatively high upper position, the levers 32 and 34, in this particular case, stand substantially upright from the support 22, and the pivots 36 and 40 are rearwardmost. The under rear portion of each link member 52 engages on top of the cross bar 44, as indicated at 54 in Fig. 3, and the under rear portions of the link members 52 engage intermediate upper portions of the links 48 as at 56 in Fig. 3. Thus, the linkage is exploited as stop means for limiting swinging of the levers 32 and 34 and linkage 46—48 to the position shown, and additional stop means need not be employed. However, in the absence of the stop as thus provided it will be noted that in both positions of the seat, the cross bar 44 also is in position to act as a stop, and one stop may be considered as augmenting the other; although, either could be used without the other. For example, if design considerations permit the elimination of the cross bar 44 the linkage stop alone may be relied on.

In either case, the stop means is one-way effective so that the levers may swing to the position of Fig. 4, wherein it will be seen that they depend from the fulcra 24 and 26, and at this time the rear portion of the upper link structure 46 engages the top portion of the link means 48 from above, as at 58, and the bar 44 engages the top of the links 48, thus affording stop means for limiting the position of the seat to the low forward position. As will be seen, the levers 32 and 34 rotate substantially through 180°.

As will be further seen from a comparison between Figs. 3 and 4, the seat in the former faces rearwardly and in the latter faces forwardly. The two positions of the seat as such are achieved by an upright pivot mounting the seat on the top link structure 46. This pivot preferably comprises a vertical stub shaft or pin 60 which is rigidly secured to the top plate 50 and which projects therethrough to be rigidly secured, as by welding, to a lower strap 62. The seat 20 includes a seat base 64 which carries a vertical sleeve 66 mounted on the stub shaft or pin 60. The assembled relationship between the link structure 46 and the seat base 64 is retained by a snap ring or other suitable fastener, as indicated at 68.

The seat as such is releasably lockable in either of its two positions against turning about the pivot pin 60. For this purpose, the seat base 64 carries a depending pivot 70 which mounts a fore-and-aft lever 72, the forward end of which projects at the front end of the seat 20 for the convenience of the operator. The lever is notched at its opposite end at 74 for selective engagement with either of two laterally spaced apart upright studs 76 and 78 rigid on the top plate 50 of the link structure 46. Resilient means such as a torsion spring 80 operates to maintain the lever in such direction that the notch 74 receives one or the other of the studs 76 or 78 depending upon the forwardly facing or rearwardly facing position of the seat. A stop 82 on the seat base 64 limits movement of the lever 72 in one direction (clockwise as seen in Fig. 6). In other words, the lever 72, as seen in Fig. 6, is moved counterclockwise to release its notch 74 from the pin 76, and the seat, carrying the lever can be turned 180°, in either direction, and the notch 74 will engage the other pin or stud 78.

The seat 20 is also mounted on the seat base 64 for relative fore-and-aft adjustment, and this may be accomplished is any conventional manner. As indicated, a releasable latch 84 is provided for the purpose of controlling a pin 86.

Thus, the single seat is positionable in either of the two positions indicated and in addition may be adjusted fore-and-aft. The interengagement of the linkage to afford the stop means enables the accomplishment of the two positions, which in this case are the relatively low forward position and the relatively high rearward position, which is particularly suitable for the environment illustrated.

It should be noted that without the follower effect of the links 48, the seat could depart from horizontal when swinging from one position to the other. In this respect, it is significant that the pivot 38 is not in line with the pivots 24 and 36, nor is the pivot 42 in line with the pivots 26 and 40. This affords a desirable linkage geometry that assures a level seat in all positions. Variations in the disclosed structure may be readily resorted to without departure from the spirit and scope of the invention.

What is claimed is:

1. In a bi-positionable seat and a support therefor, the improvement residing in means connecting the seat to the support for fore-and-aft shifting between a high rear position and a low forward position, comprising: parallel front and rear levers respectively having fulcrumed ends mounted on the support on front and rear transverse fulcra for swinging between generally upright positions rising from the support and lower positions depending from the support, each lever having a terminal end and including a transverse pivot at its terminal end and a transverse pivot intermediate said ends; each lever being so constructed that its terminal end and intermediate pivots and its fulcrum are triangularly arranged so that in the high rear position of the seat the terminal end pivots are rearwardmost and the intermediate pivots are forwardmost and in its low forward position the terminal end pivots are forwardmost and the intermediate pivots are rearwardmost; a pair of parallel fore-and-aft links connecting the levers and including a first link connected at opposite ends to said terminal end pivots and a second link connected at opposite ends to the intermediate pivots for fore-and-aft swinging of the levers about said fulcra, said second link lying below the first link and arranged to engage said first link from below to provide stop means limiting fore-and-aft swinging of the levers and links to achieve the two positions of the seat; and means mounting the seat on one of the links.

2. The invention defined in claim 1, in which: the means mounting the seat on the cross-connecting means includes an upright pivot about which the seat is turnable relative to said one of the links to face either forwardly or rearwardly.

3. The invention defined in claim 1 further characterized by stop means including a cross bar rigidly cross-connecting one pair of levers and adapted to engage one pair of links in at least one position of the seat.

4. The invention defined in claim 2, including: releasable means for locking the seat against turning about said upright pivot.

References Cited in the file of this patent

UNITED STATES PATENTS

| 2,749,969 | Tatter | June 12, 1956 |
| 2,809,689 | Garvey et al. | Oct. 15, 1957 |

FOREIGN PATENTS

| 20,704/29 | Australia | June 18, 1929 |
| 734,969 | Great Britain | Aug. 10, 1955 |